US006682843B2

(12) United States Patent
Speranza et al.

(10) Patent No.: US 6,682,843 B2
(45) Date of Patent: Jan. 27, 2004

(54) INTEGRAL SCREEN/FRAME ASSEMBLY FOR AN ELECTROCHEMICAL CELL

(75) Inventors: Antonio J. Speranza, West Hartford, CT (US); Lawrence C. Moulthrop, Jr., Windsor, CT (US); Trent M. Molter, Glastonbury, CT (US); Mark E. Dristy, Manchester, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 217 days.

(21) Appl. No.: 09/802,191

(22) Filed: Mar. 8, 2001

(65) Prior Publication Data

US 2001/0008722 A1 Jul. 19, 2001

Related U.S. Application Data

(63) Continuation of application No. 09/464,143, filed on Dec. 16, 1999, now abandoned.
(60) Provisional application No. 60/114,355, filed on Dec. 29, 1998.

(51) Int. Cl.$^7$ ............................. H01M 2/14; H01M 2/18
(52) U.S. Cl. ..................... 429/34; 429/38; 205/687
(58) Field of Search ..................... 205/687; 429/34, 429/38, 8, 208, 234

(56) References Cited

U.S. PATENT DOCUMENTS

| | | |
|---|---|---|
| 3,936,005 A | 2/1976 | Schnell ..................... 241/83 |
| 4,293,394 A | 10/1981 | Darlington et al. ........... 204/98 |
| 4,317,864 A | 3/1982 | Strasser ..................... 429/36 |
| 4,410,410 A | 10/1983 | Deborski ................... 204/277 |
| 4,545,886 A | 10/1985 | de Nora et al. ............. 204/252 |
| 4,732,660 A | 3/1988 | Plowman et al. ........... 204/265 |
| 4,756,980 A | 7/1988 | Niksa et al. ................. 429/27 |
| 5,009,968 A | 4/1991 | Guthrie et al. .............. 429/26 |
| 5,296,109 A | 3/1994 | Carlson et al. |
| 5,316,644 A | 5/1994 | Titterington et al. ........ 204/284 |
| 5,350,496 A | 9/1994 | Smith et al. ................ 204/129 |
| 5,372,689 A | 12/1994 | Carlson et al. |
| 5,466,354 A | 11/1995 | Leonida et al. ............. 204/252 |
| 5,580,672 A | 12/1996 | Zagaja, III et al. ........... 429/13 |
| 5,783,050 A * | 7/1998 | Coin et al. .................. 204/242 |
| 5,817,220 A | 10/1998 | Chen .......................... 204/213 |
| 5,824,199 A | 10/1998 | Simmons et al. ........... 204/262 |
| 6,024,848 A | 2/2000 | Dufner et al. .............. 204/252 |
| 6,099,716 A * | 8/2000 | Molter et al. ............... 205/687 |
| 6,171,719 B1 | 1/2001 | Roy et al. .................... 429/39 |
| 6,270,636 B1 | 8/2001 | Byron, Jr. et al. .......... 204/252 |
| 6,368,740 B1 * | 4/2002 | Dristy ......................... 429/35 |

FOREIGN PATENT DOCUMENTS

| | | |
|---|---|---|
| DE | 3112798 A1 | 1/1982 |
| DE | 31 12 798 A1 | 1/1982 |
| EP | 0 275 466 A1 | 7/1988 |
| WO | WO 93/24677 | 12/1993 |
| WO | WO 98/13891 | 4/1998 |
| WO | WO 98/23794 | 6/1998 |
| WO | WO 98/24136 | 6/1998 |
| WO | WO 98/40537 | 9/1998 |
| WO | WO 99/27599 | 6/1999 |
| WO | WO 99/61684 | 12/1999 |

OTHER PUBLICATIONS

J. F. McElroy, T. M. Molter, and R. N. Sexauer; "SPE Hydrogen/Oxygen Fuel Cells for Rigorous Naval Applications"; Proceedings of the 34th International Power Sources Symposium, Cherry Hill, New Jersey, Jun. 25, 1990; IEEE Service Center, Piscataway, NJ, pp. 403–407.
http://home.pacifier.com/~stgi/finemesh.htm (2 pages) No Date.
http://www.exmet-corp.com/t.html (4 pages) No Date.

* cited by examiner

*Primary Examiner*—Patrick Ryan
*Assistant Examiner*—Tracy Dove
(74) *Attorney, Agent, or Firm*—Cantor Colburn LLP

(57) ABSTRACT

An integral screen/frame assembly for use in an electrochemical cell for supporting and facilitating the hydration of a solid membrane. The screen/frame assembly is comprised of planar screen layers having the frame disposed about the periphery of those layers such that the frame bonds the layers together.

31 Claims, 4 Drawing Sheets

INTEGRAL SCREEN/FRAME ASSEMBLY FOR AN ELECTROCHEMICAL CELL

CROSS-REFERENCE TO RELATED APPLICATIONS

This application is a continuation of U.S. application Ser. No. 09/464,143 filed on Dec. 16, 1999, now abandoned, which claims priority to and incorporates by reference U.S. Provisional Application Ser. No. 60/114,355, filed on Dec. 29, 1998.

TECHNICAL FIELD

The present invention relates generally to electrochemical cells, and especially relates to an electrochemical cell having an integral screen/frame assembly and/or a screen pack with a porous woven layer.

BACKGROUND OF THE INVENTION

Electrochemical cells are energy conversion devices, usually classified as either electrolysis cells or fuel cells, including electrolysis cells having a hydrogen water feed. A proton exchange membrane electrolysis cell functions as a hydrogen generator by electrolytically decomposing water to produce hydrogen and oxygen gases. Referring to FIG. 1, in a typical single anode feed water electrolysis cell 101, process water 102 is reacted at oxygen electrode (anode) 113 to form oxygen gas 104, electrons, and hydrogen ions (protons) 105. The reaction is created by the positive terminal of a power source 106 electrically connected to anode 113 and the negative terminal of a power source 106 electrically connected to hydrogen electrode (cathode) 107. The oxygen gas 104 and a portion of the process water 102' exit cell 101, while protons 105 and water 102" migrate across proton exchange membrane 108 to cathode 107 where hydrogen gas 109, is formed.

The typical electrochemical cell includes a number of individual cells arranged in a stack with fluid, typically water, forced through the cells at high pressures. The cells within the stack are sequentially arranged including a cathode electrode, a proton exchange membrane, and an anode electrode. The cathode/membrane/anode assemblies (hereinafter "membrane and electrode assembly") are supported on either side by packs of screen or expanded metal which are in turn surrounded by cell frames and separator plates to form reaction chambers and to seal fluids therein. The screen packs establish flow fields within the reaction chambers to facilitate fluid movement and membrane hydration, and to provide both mechanical support for the membrane and a means of transporting electrons to and from the electrodes.

As stated above, the screen packs support the membrane assembly. The membrane is typically only about 0.002–0.012 inches in thickness, when hydrated, with the electrodes being thin structures (less than about 0.002 inches) of high surface area noble metals pressed or bonded to either side of the membrane and electrically connected to a power source. When properly supported, the membrane serves as a rugged barrier between the hydrogen and oxygen gases. The screen packs, positioned on both sides of the membrane against the electrodes, impart structural integrity to the membrane assembly.

Existing cell frames have a number of drawbacks and disadvantages. For example, current technology uses protector rings to bridge the gap between the cell frame and screen packs. The protector rings, typically positioned about the perimeter of the frame, prevent membrane extrusion and "pinching" between the frame and the screen. Although these protector rings function well in operation, they render assembly of the cell very difficult, often breaking loose, resulting in misalignment and possible damage to the membrane. Specifically, because of their small cross-section, the protector rings tend to slide out of position and as a result often do not cover the gap between the frame and the screen which they are intended to bridge.

What is needed in the art is an improved screen assembly which provides structural integrity and simplified cell assembly while maintaining or improving the cell's mass flow characteristics.

SUMMARY OF THE INVENTION

The present invention relates to an integral screen/frame assembly and to an electrochemical cell stack. The screen/frame integral assembly comprises: on: at least two screen layers, and a frame. Each of the screen layers has an interior portion with a porosity and has a periphery, a first screen layer having first openings having a size of up to about 0.077 inches (1.96 mm) or less b to about 0.033 inches (0.838 mm), wherein a thickness of said first screen layer is up to about 0.005 inches screen layer are interrelated such that the combination of said size and said thickness enable the passage of water and a gas through said first opening. The second screen layer has second openings, wherein the second screen layer is disposed parallel to and in contact with said first screen layer, wherein at least a portion of said second screen layer has a thickness grater than the thickness of the first screen layer. The frame comprises a frame material adapted to be extruded into the periphery of the screen while substantially maintaining the porosity of said interior portion, said frame having fluid conduits disposed therein, and wherein said frame material bonds said at least two screen layers together.

The electochemical cell stack comprises: an electrolyte membrane having a first gas side and a second gas side; a first gas electrode disposed on the first gas side of the membrane; a second gas electrode disposed on the second gas side of the membrane; and an integral screen/frame assembly disposed adjacent to and in intimate contact with the first gas side, comprising: one or more screen layers having an interior portion with a porosity and having a periphery; and a frame disposed about the periphery or the screen layer(s) while substantially maintaining the porosity of the interior portion, the frame having fluid conduits disposed therein.

The above discussed and other features and advantages of the present invention will be appreciated and understood by those skilled in the art from the following detailed description and drawings.

BRIEF DESCRIPTION OF THE DRAWINGS

Referring now to the drawings, which are meant to be illustrative, not limiting, and wherein like elements are numbered alike in the several FIGURES.

The Figures are meant to further illustrate the present invention and not to limit the scope thereof.

DETAILED DESCRIPTION OF THE PREFERRED EMBODIMENT

The screen/frame assembly of the present invention comprises multilayers of screens with layers of frame material disposed about the periphery, integral with the screen layer. Essentially, the frame forms a ring around and through the outer edge of the screen layers, bonding the layers together in an integral structure.

The screen layers can be any conventional screen configuration, with the configuration disclosed in commonly assigned U.S. patent application Ser. No. 09/102,305, to Treat Molter et at, (Attorney Docket No. 97-1801) (hereby incorporated by reference) preferred. The screens should be electrically conductive and have a sufficient open area via perforations, openings between screen strands, or otherwise, to enable substantially unobstructed access of hydrogen, oxygen, and water to and/or from the electrodes. Possible screen materials can be electrically conductive materials, including, but not limited to, metal or metal-ceramic plates or strands in the form of perforated or porous sheets, or a woven mesh, such as niobium, nickel, cobalt, zirconium, titanium, steel (such as stainless), or tantalum, among others, and alloys thereof.

Figure 3:
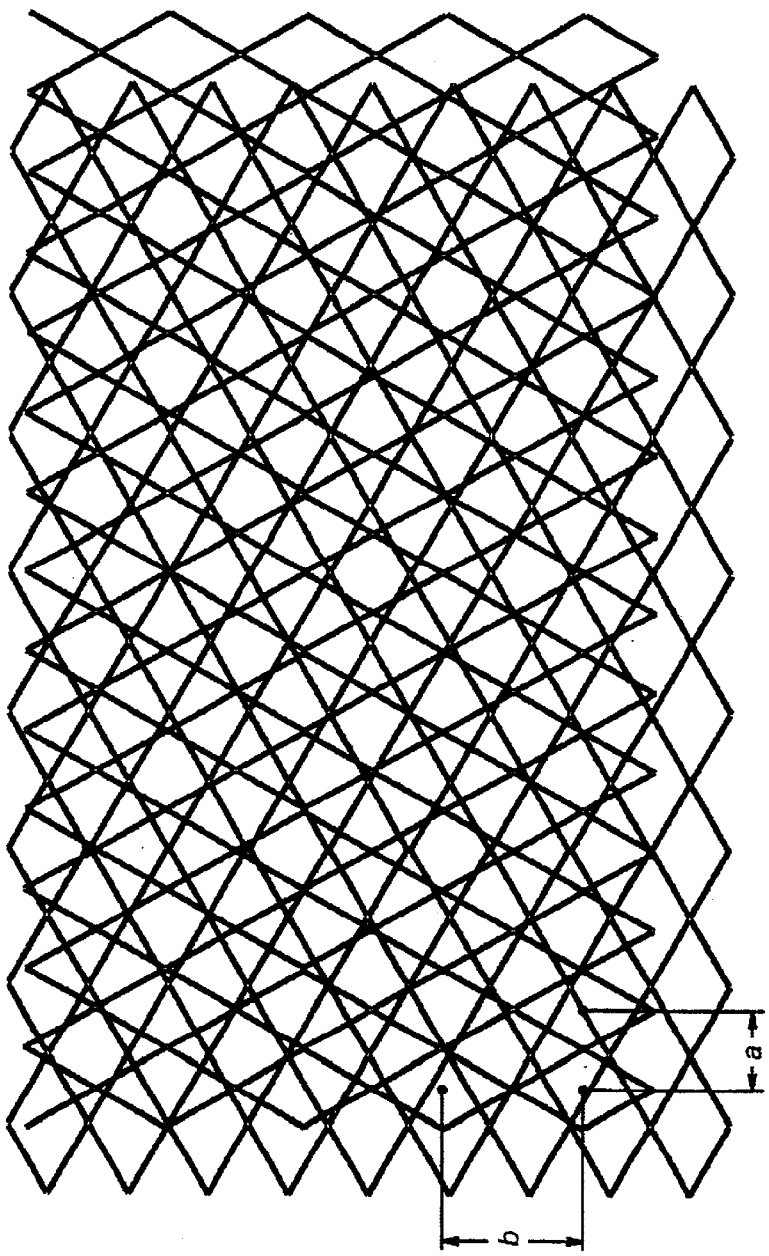
FIG. 3 is a plan view of one embodiment of a screen assembly of the present invention.

At least some of the screens are preferably planar layers having elongated openings, such as diamond or elliptical shapes, formed by strands. These openings can have a size of up to about 2/0 or greater. However, for operation at a pressure differential of about 400 psi., it is preferred to employ small screen openings to prevent membrane blowout into the screen on the low pressure side of the membrane assembly. In one embodiment, a reduced opening size for at least the first screen layer is employed, with a reduced opening size employed for subsequent screen layers based upon mass flow demands. The actual size of the openings (perforations or holes) is dependent upon the desired mass flow rate and number of screen layers to be employed. Referring to FIG. 3, for a diamond pattern in an electrolysis cell operating at a 390 psi pressure differential, the preferred diamond size is less than 0.125 inches (3.17 mm) for dimension "b" (which is the width of a diamond of the pattern, or the distance from the center of one diamond to the center of an adjacently positioned diamond) by less than 0.071 inches (1.80 mm) for dimension "a" (which is the height of a diamond of the pattern, or the distance from the center of a diamond to the center of an adjacently positioned diamond in a direction perpendicular to dimension "b"). That is, about 3/0 to about 5/0 is preferred, and a 4/0 screen, which is about 0.077 inches (116 mm) by about 0.033 inches (0.838 mm) to about 0.046 inches (1.17 mm) is especially preferred for the screen layer adjacent the electrode. Subsequent layers can also employ small opening sizes or can have an opening size larger than the opening size of the screen layer adjacent the electrode to improve mass flow characteristics.

Figure 6:
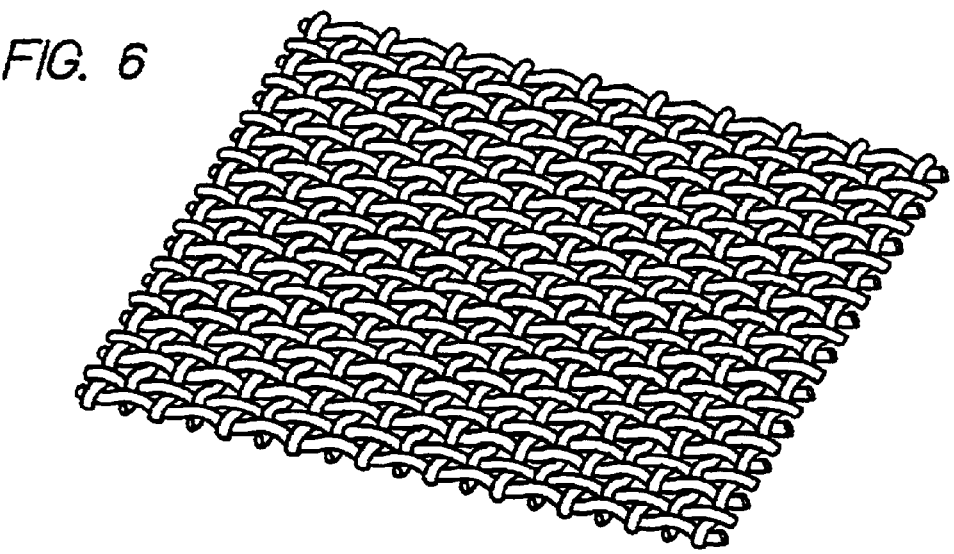
FIG. 6 is an isometric view of one embodiment of a woven mesh of the present invention.

In another embodiment, one or more layers can be a woven mesh screen (see FIG. 6). Although this mesh screen can be disposed anywhere within the screen pack, it is preferably disposed adjacent to and in intimate contact with the membrane and electrode assembly or the first screen layer. In this embodiment, the woven mesh screen provides structural integrity to the membrane. However, due to the hydrophobic nature of the mesh screen, an expanded screen having a relatively hydrophilic nature is preferably disposed between the woven mesh screen and the membrane.

The mesh size of the woven mesh screen is based upon the desired structural integrity requirements for the membrane and the desired gas production rate. For example, as the production pressure increases, the woven mesh size decreases to provide the desired structural integrity, and the current density (and therefore the production rate) is decreased to prevent membrane dehydration. Typically, the woven mesh screen can have a mesh size up to and exceeding about 200 mesh (e.g., up to about 300 mesh), with about 10 to about 110 mesh preferred, and about 20 to about 80 mesh especially preferred.

The preferred mesh size is determined based upon the relationship between the desired current density, production rate, production pressure, and issues of membrane dehydration. Since the woven mesh provides structural integrity to the membrane, as the production pressure increases, the mesh size preferably decreases (e.g. at a production pressure of about 50 p.s.i. the preferred mesh size is about 20 mesh, while at a production pressure of about 400 p.s.i. the preferred mesh size is about 80 mesh). As the mesh size decreases, however, the transfer characteristics of water to the membrane and oxygen from the membrane are restricted. Consequently, localized membrane dehydration can occur. To avoid membrane dehydration, it is typically preferred to decrease the current density, thereby decreasing the production rate of oxygen and hydrogen. Therefore, the balance of the desired production rate and membrane structural integrity is weighed against the possibility of membrane dehydration.

Figure 7:
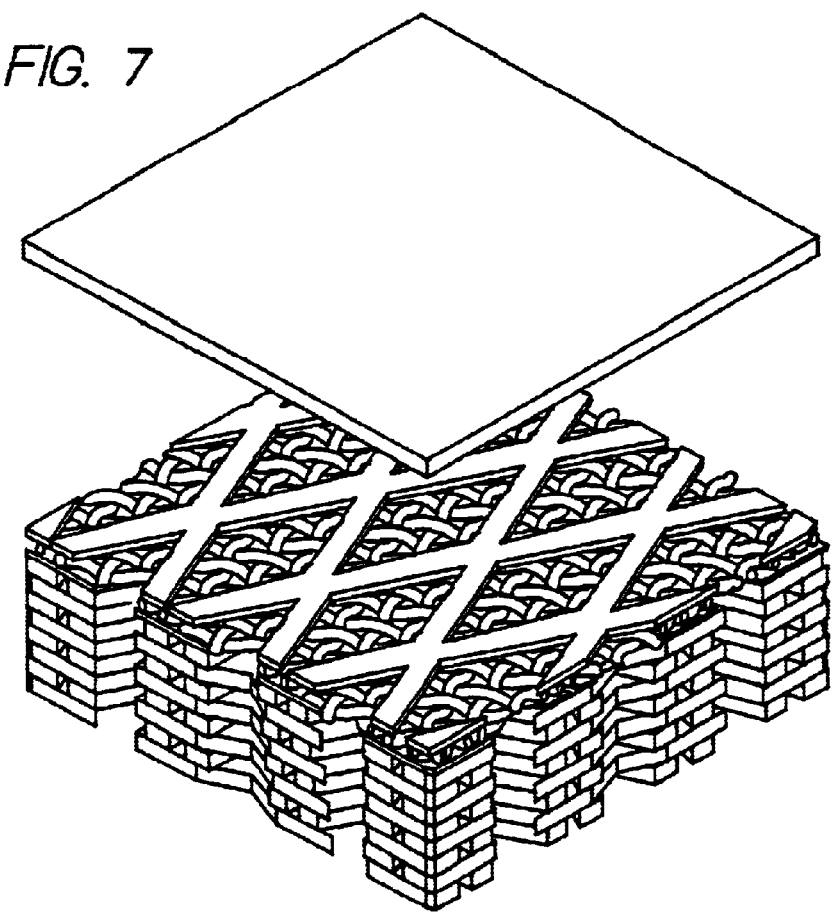
FIG. 7 is an isometric view of one embodiment of a screen pack of the present invention employing a woven mesh.

Referring to FIG. 7, in this embodiment the screen layer disposed between the woven mesh and the electrode has screen openings that are elongated, such as diamond or elliptical shape. These openings can have a size of about 3/0 to about 5/0, with smaller openings especially preferred for higher pressure differential applications. The screen layer disposed between the woven mesh and the electrode has a thickness up to about 5 mill (0.005 inches; 0.127 mm), with up to about 4 mils (0.004 inches; 0.102 mm) preferred, up to about a 3.5 mil (0.0035 inches: 0.089 mil) thickness more preferred, and about a 3 mil (0.003 inches; 0.076 mm) thickness or less also preferred. In contrast, subsequent screen layers (i.e. those disposed on the opposite side of the woven mesh) typically have screen openings up to or exceeding about 7/0, with about 3/0 to about 5/0 generally preferred, and about 4/0 especially preferred, and have a thickness up to about 7 mils or more, with a thickness of about 3 mils to about 5 mil generally employed.

The integral frame can be formed of any material that is compatible with the electrochemical cell environment, is capable of bonding the screen layers together, and preferably, is easily processed. Possible frame materials include, but are not limited to, thermosetting, thermoplastic, and rubber materials, such as polyetherimide, polysulfone, polyethersulfone, and polyarylether ketone (PEEK), Viton® (commercially available from E.I. duPont de Nemours and Company, Wilmington, Del.), ethylenepropylenediene monomer, ethylenepropylene rubber, among others, and mixtures thereof, with thermoplastic materials preferred due to ease of manufacture. One example of a useful thermoplastic material is polyetherimide (e.g. Ultem® 1000 commercially available from General Electric Company, Pittsfield, Mass.).

Figure 4:
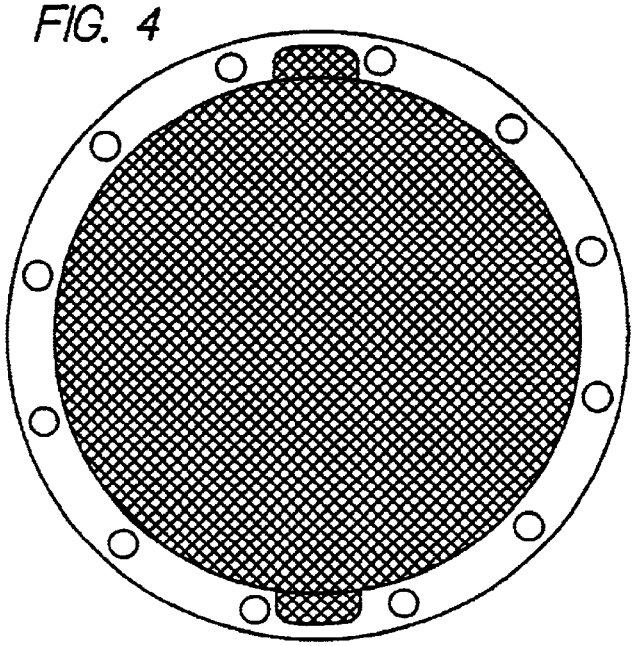
FIG. 4 is a top view of another embodiment of the integrated frame screen assembly of the present invention.
Figure 5:
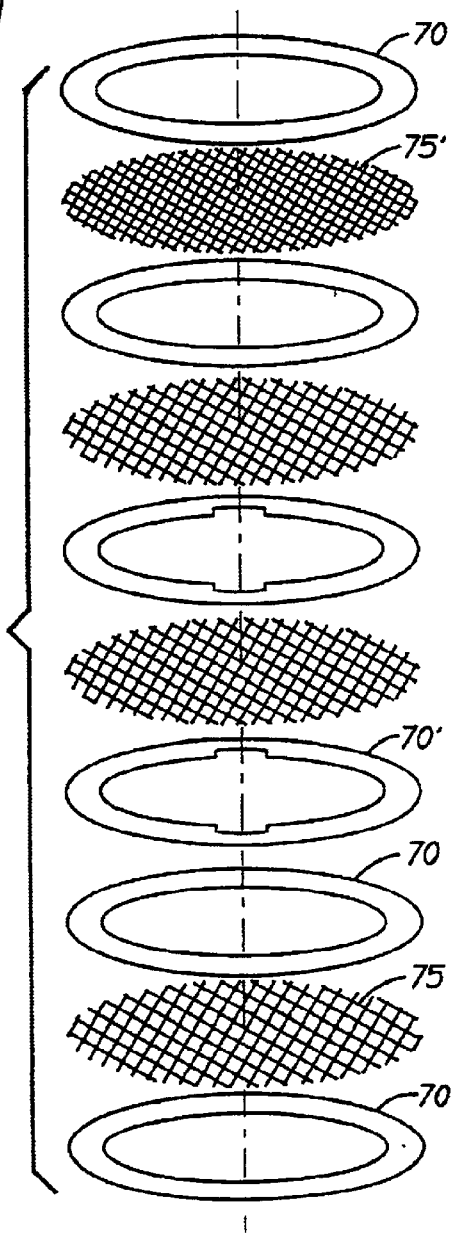
FIG. 5 is an expanded side view of the integrated frame screen assembly of FIG. 4.

Production of the screen/frame assembly can be any conventional manner of extruding the frame material into the screen layers accordingly, with actual processing conditions dependent upon the particular material employed. For example, Ultem® resin can be integrated with the screen layers by stacking the screen layers accordingly; placing an Ultem® resin ring above, below, and/or within the screen stack (70, 70'), and heating the stack under pressure to extrude the Ultem® resin through the stack, about the periphery of the screen layers (75, 75') (see FIG. 5). In the alternative, multiple thin layers of Ultem® resin can be alternately stacked between the screen layers. Again the stack is heated under pressure to force the Ultem® resin through the screens, thereby bonding them together to form an integral screen/frame assembly (see FIG. 4).

Temperatures and pressures sufficient to extrude the frame through the periphery of the screen and bond the various layers of screen and frame together can be employed. Typically, with a thermoplastic material such as Ultem® resin, for example, temperatures of about 250° F. to 500° F. at pressures of about 10,000 to 20,000 pounds per square inch (psi) can be used, with temperatures of about 300° F. to about 350° F. at pressures of about 13,500 psi to about 16,000 psi preferred.

The frame material should have a sufficient overall thickness to enable bonding of all of the screen layers and to attain sufficient electrical contact between the screen layers and the membrane, while preferably not forming a ridge or other extension above the surface layers of the screens. Preferably, the overall frame thickness is approximately equal to the overall screen thickness to establish a uniformity between the frame and screen interface.

In a farther preferred embodiment, the frame has the desired manifolds formed therein prior to assembling with the screens. In this embodiment, it is preferred not to over-heat the frame material. Preferably the material is only heated to a temperature which will enable extrusion into the screen, without allowing significant deformation or blockage of the manifolds. Once the extrusion process is complete, the integrated frame/screen assembly is preferably cooled slowly so as to reduce thermal stress. For example, the assembly is cooled from about 350° F. to about 90° F. or lower over a period of about 15 minutes or more.

Figure 1:
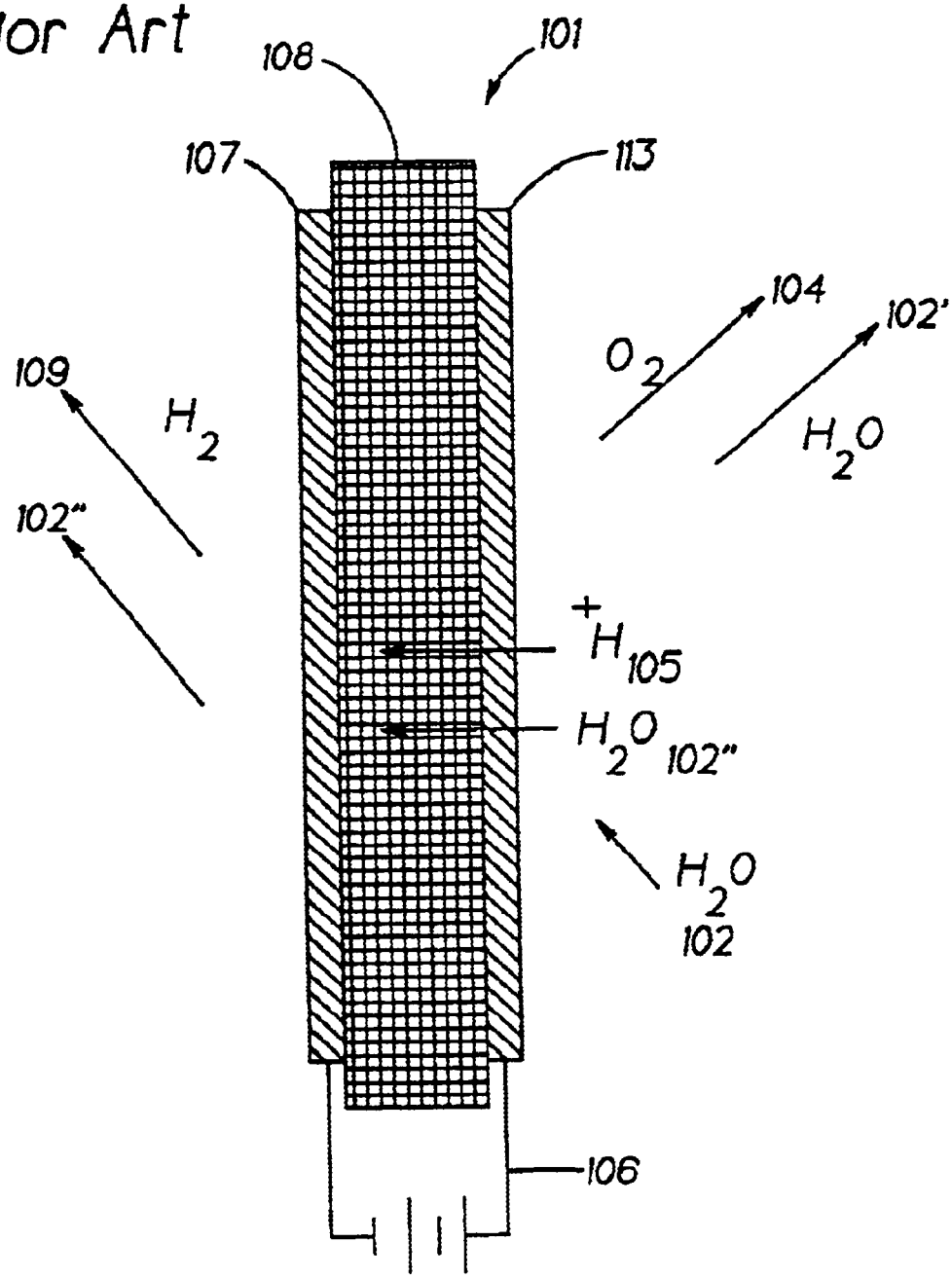
FIG. 1 is a schematic diagram of a prior art electrochemical cell showing an electrochemical reaction.
Figure 2:
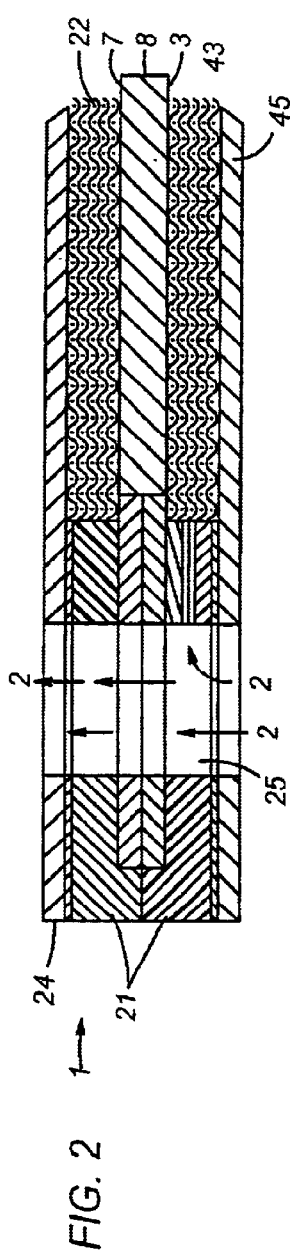
FIG. 2 is a cross sectional view of one embodiment of an electrochemical cell showing the relationship of the cell components.

Referring now to FIG. 2, an exemplary embodiment of an electrochemical cell is shown at 1. Electrochemical cell 1 is generally defined by a membrane 8 having an anode 3 disposed at one side and a cathode 7 disposed at an opposing side. Screen packs 43 and 22 are respectively disposed at anode 3 and cathode 7. Cell plate 45 is disposed at screen pack 43 and cell plate 24 is disposed at screen pack 22 to sandwich electrochemical cell 1 together. Frames 21 are disposed at the periphery of electrochemical cell 1. In operation process water 2 enters an inlet port at a conduit 25 extending through electrochemical cell 1. A portion of the water 2 is diverted from conduit 25 into oxygen screen pack 43. A portion of the water 2 not diverted into screen pack 43 continues along conduit 25 formed by axially aligned holes in the components comprising the stack, and enters subsequent cells in the cell stack (not shown) positioned outside of the cell 1. The portion of process water 2 diverted through screen pack 43 contacts anode 3 where the water electrochemically converts to oxygen gas, protons, and electrons. Oxygen gas, as well as excess water, is exhausted from the cell through porting arrangements similar to those through which water is directed to the anode 3. The generation of gases in the cell, combined with external pressure regulation, produces a large pressure differential between the oxygen side and the hydrogen side of the cell. This pressure differential forces membrane 8 and cathode 7 against the opposing screen pack. It should ho noted that the direction of the pressure differential, i.e., greater or lower pressure on the cathode side, is dependent upon the application requirements of the electrochemical system.

In another embodiment a hydrogen feed cell can be used. A hydrogen feed cell feeds water to the membrane from the hydrogen side of the membrane. As water on the oxygen side electrode is electrochemically broken down into protons and oxygen, the membrane becomes locally less saturated with water. Water from the hydrogen side of the membrane is then wicked or drawn to the oxygen side to the less saturated areas of the membrane, and a constant supply of reactant water to the membrane is thereby established. In this embodiment, factors such as current density and feed pressures are controlled as before to assure membrane integrity.

The screen/frame assembly of the present invention is inexpensive to develop and manufacture far the following reasons, among others, the ability to manufacture using continuous processing; elimination of the requirement for expensive molds; elimination of the need for the protector ring; simplification of cell assembly and reduction of assembly time due to the integration of parts; enhancement of reliability due to reduced handling; and ready automation of the manufacturing process for high volume production with roll sheeting and heated rollers. For example, the screen/frame integral assembly establishes a significantly lower pressure drop across the fluid manifolds (in the order of about 0.10 times the pressure drop of conventional screen frame assembly), provides membrane support of elevated pressure operation (greater than about 1,000 p.s.i.g. (pounds per square inch gauge) and up to or exceeding 2,000 p.s.i.g., wit up to about 4,000 p.s.i.g. and greater possible), requires less energy to move fluids, and eliminates the need for mechanical compression compared to conventional systems which employ separate screens and frames.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A screen/frame integral assembly, comprising:

at least two screen layers, each having an interior portion with a porosity and having a periphery, a first screen layer having first openings having a size of up to about 0.077 inches (1.96 mm) by up to about 0.033 inches (0.838 mm), wherein a thickness of said first screen layer is up to about 0.005 inches (0.127 mm), and wherein said size of said first openings and said thickness of said first screen layer are interrelated such that the combination of said size and said thickness enable the passage of water and a gas through said first openings; and a second screen layer having second openings, wherein said second screen layer is disposed parallel to and in contact with said first screen layer, wherein at least a portion of said second screen layer has a thickness greater than the thickness of the first screen layer; and a frame disposed through and about the periphery of each screen layer, wherein the frame comprises a frame material adapted to be extruded into the periphery of the screen while substantially maintaining the porosity of said interior portion, said frame having fluid conduits disposed therein, and wherein said frame material bonds said at least two screen layers together.

2. An electrochemical cell stack, comprising:

an electrolyte membrane having a first gas side and a second gas side;

a first gas electrode disposed on said first gas side of said membrane;

a second gas electrode disposed on said second gas side of said membrane;

a first integral screen/frame assembly disposed adjacent to and in intimate contact with said first gas electrode, comprising:

at least two screen layers, each having an interior portion with a porosity and having a periphery, wherein a first screen layer has first openings having a first size of up to about 0.077 inches (1.96 mm) by up to about 0.033 inches (0.838 mm) and a first thickness of up to about 0.005 inches (0.127 mm), wherein a second screen layer having second openings is disposed parallel to and in contact with said first screen layer and said first size and said first thickness are interrelated such that the combination of said first size and said first thickness enable the passage of water and a first gas through said first openings, and wherein said second openings have a second size and a second thickness, wherein said first thickness is less than said second thickness; and a frame disposed through and about the periphery of each screen layer, wherein the frame comprises a frame material adapted to be extruded into the periphery of the screens while substantially maintaining the porosity of said interior portion, said frame having fluid conduits disposed therein;

and, a second gas screen assembly disposed adjacent to and in contact with said second gas electrode.

3. A screen/frame integral assembly as in claim 1, wherein said thickness is up to about 0.004 inches (0.102 mm).

4. A screen/frame integral assembly as in claim 1, wherein said thickness is up to about 0.089 mm.

5. A screen/frame integral assembly as in claim 1, wherein at least a portion of said second openings are of a larger size than said first openings.

6. A screen/frame integral assembly as in claim 1, wherein the thickness of the first screen layer is about half of the thickness of the second layer.

7. A screen/frame integral assembly as in claim 1, wherein each screen of said screen layer has first openings which have a substantially elongated, diamond or oval shaped geometry.

8. A screen/frame integral assembly as in claim 7, wherein said first openings in said screen of said screen layer are disposed generally orthogonal to openings in an adjacently positioned second screen of said screen layer.

9. A screen/frame integral assembly as in claim 1, wherein said frame material comprises a thermoplastic, thermosetting, or rubber material, or mixtures thereof.

10. A screen/frame integral assembly as in claim 9, wherein said frame material is polyetherimide, polysulfone, polyothersulfone, polyarylether ketone, ethylenepropylene-diene monomer, ethylenepropylene rubber, or mixtures thereof.

11. A screen/frame integral assembly as in claim 9, wherein at least one of said screen layers is a woven mesh.

12. A screen/frame integral assembly as in claim 11, wherein said woven mesh is disposed between and in intimate contact wit two of said screen layers.

13. A screen/frame integral assembly as in claim 11, wherein said woven mesh has a mesh size up to about 300 mesh.

14. A screen/frame integral assembly as in claim 13, wherein said woven mesh has a mesh size up to about 200 mesh.

15. A screen/frame integral assembly as in claim 14, wherein said woven mesh has a mesh size of about 20 to about 80 mesh.

16. An electrochemical cell stack as in claim 3, wherein the electrochemical cell has a pressure differential across said membrane such that a pressure at said first gas side of said membrane is lower than pressure at said second gas side of said membrane.

17. An electrochemical cell stack as in claim 2, wherein said first thickness is up to about half of said second thickness.

18. An electrochemical cell stack as in claim 2, wherein said first openings and said second openings have a substantially elongated, diamond, or oval shaped geometry.

19. An electrochemical cell stack as in claim 18, wherein said first openings are disposed generally orthogonal to said second openings.

20. An electrochemical cell as in claim 2, wherein said first thickness is up to about 0.0035 inches (0.089 mm).

21. An electrochemical cell stack as in claim 2, wherein the frame material is a thermoplastic, thermosetting, or rubber material, or mixtures thereof.

22. An electrochemical cell stack as in claim 21, wherein said frame material is polyetherimide, polysulfone, polyethersulfone, polyarylether ketone, ethylenepropylene-diene monomer, ethylenepropylene rubber, or mixtures thereof.

23. An electrochemical cell as in claim 2, wherein at least one screen layer comprises at least one woven mesh.

24. An electrochemical cell as in claim 23, wherein said woven mesh is disposed between and in intimate contact with two of said screen layers.

25. An electrochemical cell as in claim 23, wherein said woven mesh is from about 20 to about 80 mesh.

26. An electrochemical cell as in claim 21, wherein said screen/frame assembly is capable of providing structural integrity to said electrolyte membrane with a pressure differential across said electrolyte membrane of greater than 400 psi.

27. An electrochemical cell as is claim 21, wherein the pressure differential across said electrolyte is greater than 1,000 psig.

28. An electrochemical cell screen assembly, comprising a screen layer and a woven layer, wherein said screen layer and said woven layer have an interior portion with a porosity, and wherein said woven layer has a different thickness than said screen layer.

29. An electrochemical cell screen assembly as in claim 28, wherein said woven layer has a mesh size up to about 300 mesh.

30. An electrochemical cell screen assembly as in claim 28, wherein said woven layer has a mesh size up to about 200 mesh.

31. An electrochemical cell screen assembly as in claim 28, wherein said woven layer has a mesh size of about 20 to about 80 mesh.

* * * * *